United States Patent
Hashemzadeh

(10) Patent No.: US 12,291,589 B2
(45) Date of Patent: May 6, 2025

(54) COMPOSITE PARTICLES WITH ORGANIC AND INORGANIC DOMAINS

(71) Applicant: WACKER CHEMIE AG, Munich (DE)

(72) Inventor: Abdulmajid Hashemzadeh, Burghausen (DE)

(73) Assignee: Wacker Chemie AG, Munich (DE)

( * ) Notice: Subject to any disclaimer, the term of this patent is extended or adjusted under 35 U.S.C. 154(b) by 572 days.

(21) Appl. No.: 17/268,984

(22) PCT Filed: Nov. 26, 2018

(86) PCT No.: PCT/EP2018/082588
§ 371 (c)(1),
(2) Date: Feb. 17, 2021

(87) PCT Pub. No.: WO2020/108734
PCT Pub. Date: Jun. 4, 2020

(65) Prior Publication Data
US 2022/0119566 A1    Apr. 21, 2022

(51) Int. Cl.
| | |
|---|---|
| *C08F 220/06* | (2006.01) |
| *C08F 2/30* | (2006.01) |
| *C08F 220/14* | (2006.01) |
| *C08F 220/18* | (2006.01) |
| *C08F 220/20* | (2006.01) |
| *C08J 3/21* | (2006.01) |
| *C08K 3/36* | (2006.01) |
| *C08K 5/06* | (2006.01) |
| *C08K 5/42* | (2006.01) |

(52) U.S. Cl.
CPC .............. *C08F 220/06* (2013.01); *C08F 2/30* (2013.01); *C08F 220/14* (2013.01); *C08F 220/1802* (2020.02); *C08F 220/1804* (2020.02); *C08F 220/20* (2013.01); *C08J 3/212* (2013.01); *C08K 3/36* (2013.01); *C08K 5/06* (2013.01); *C08K 5/42* (2013.01); *C08J 2333/02* (2013.01); *C08J 2333/08* (2013.01); *C08J 2333/12* (2013.01); *C08J 2383/06* (2013.01)

(58) Field of Classification Search
CPC ................. C08F 220/06; C08F 220/14; C08F 220/1802; C08F 220/1804; C09J 3/212; C09J 2333/08; C09J 2383/06; C08K 3/36
USPC ....................................... 524/556
See application file for complete search history.

(56) References Cited

U.S. PATENT DOCUMENTS

| | | | |
|---|---|---|---|
| 3,544,500 A | 12/1970 | Osmond et al. | |
| 4,421,660 A | 12/1983 | Solc Nee Hajna | |
| 7,538,153 B2 | 5/2009 | Bacher et al. | |
| 2002/0156220 A1* | 10/2002 | Meyer ................ | C08F 220/283 526/319 |
| 2007/0161740 A1 | 7/2007 | Wiese et al. | |
| 2008/0051500 A1 | 2/2008 | Wiese | |
| 2011/0015340 A1 | 1/2011 | Hashemzadeh | |
| 2011/0201727 A1 | 8/2011 | Hashemzadeh et al. | |
| 2012/0016060 A1 | 1/2012 | Lohmeijer et al. | |
| 2012/0232214 A1 | 9/2012 | Hashemzadeh | |
| 2013/0337266 A1 | 12/2013 | Hashemzadeh | |
| 2016/0312083 A1* | 10/2016 | Babar .................... | C09J 131/04 |
| 2019/0218149 A1 | 7/2019 | Hashemzadeh et al. | |

FOREIGN PATENT DOCUMENTS

| | | |
|---|---|---|
| WO | 2006072464 A1 | 7/2006 |
| WO | 2009112370 A1 | 9/2009 |
| WO | 2010118961 A1 | 10/2010 |
| WO | 2012110618 A1 | 8/2012 |
| WO | 2018033219 A1 | 2/2018 |

OTHER PUBLICATIONS

T. G. Fox, Bulletin of the American Physics Society, 1956, vol. 1, Issue 3, p. 123.
J. Brandrup et al., Polymer Handbook, 2nd Edition, 1975, J. Wiley & Sons, New York.
R. J. Hunter, "Some Typical Colloidal Dispersions", Foundations of Colloid Science, 1991, vol. 1, pp. 10-17, Clarendon Press, Oxford.
Otto W. Florke et al., Ullmann's Encyclopedia of Industrial Chemistry, 1992, vol. A 23, pp. 583-660, Weinheim.
Egon Matijevic, Chemistry of Materials, 1993, vol. 5, pp. 412-426.
D. Fennell. Evans et al., The Colloidal Domain, 2nd Edition, 1994, pp. 363-405, Weinheim.
Tsutomu Mizutani et al., "Preparation of Spherical Nanocomposites Consisting of Silica Core and Polyacrylate Shell by Emulsion Polymerization", Journal of Applied Polymer Science, 2006, vol. 99, pp. 659-669.
Dong-Ming Qi et al., "Synthesis and Characterization of Poly(butyl acrylate)/Silica and Poly(butyl acrylate)/Silica/ Poly(methyl methacrylate) Composite Particles", Journal of Applied Polymer Science, 2006, vol. 99, pp. 3425-3432.
Frank Bauer et al., "Nano/Micro Particle Hybrid Composites for Scratch and Abrasion Resistant Polyacrylate Coatings", Macromolecular Materials and Engineering, 2006, vol. 291, pp. 493-498.

\* cited by examiner

Primary Examiner — Ruiyun Zhang
(74) Attorney, Agent, or Firm — BROOKS KUSHMAN P.C.

(57) ABSTRACT

Stable preparations of composite particles based on organic polymer and inorganic particles contain, as the organic polymer, an addition polymer containing moieties derived from polymerization of an unsaturated carboxylic acid in addition to vinyl ester, (meth)acrylic ester, olefin, vinyl aromatic, and/or vinyl halide monomers.

15 Claims, No Drawings

COMPOSITE PARTICLES WITH ORGANIC AND INORGANIC DOMAINS

CROSS REFERENCE TO RELATED APPLICATIONS

This application is the U.S. National Phase of PCT Appln. No. PCT/EP2018/082588 filed Nov. 26, 2018, the disclosure of which is incorporated in its entirety by reference herein.

BACKGROUND OF THE INVENTION

1. Field of the Invention

The present invention relates to composite particles based on organic polymers and finely divided inorganic solids, processes for the production thereof and use thereof, for example as an additive, binder or co-binder for various applications.

2. Description of the Related Art

Composite particles comprise organic domains, for example an organic polymer matrix, and inorganic domains, for example finely divided inorganic solids such as silica. The organic domains and the inorganic domains are generally linked to one another via physical or chemical bonds.

In common processes for producing composite particles, organic monomers in aqueous dispersions of inorganic particles are subjected to an emulsion polymerization, organic domains being anchored on the surface of the inorganic particles, as described, for example, in Dong-Ming Qi, J. of Applied Polym. Sci., 2006, vol. 99, pages 3425 to 3432; Tsutomu Mizutani, J. of Applied Polym. Sci., 2006, vol. 99, pages 659 to 669; Frank Bauer, Macromol. Mater. Eng., 2006291, pages 493 to 498 or DE-A 10 2004 010 155, U.S. Pat. Nos. 3,544,500, 4,421,660, WO-A 2006/072464 or WO-A 2010/118961. Also known are composite particles which are obtained by free-radically initiated copolymerization of ethylenically unsaturated, inorganic particles and ethylenically unsaturated, organic monomers. For this purpose, ethylenically unsaturated siloxanes have been proposed as inorganic particles in EP-A 1620271. EP-A 1243619 describes composite materials with polyacrylic acid as an organic domain and sodium silicate or colloidal silica as an inorganic domain, which are linked by divalent metal cations via ionic interactions. Such composite materials are, however, in the form of gels.

Compositions are known from DE-A 102007038333 which were produced by condensation of silicon compounds in the presence of polyvinyl alcohols, the inorganic particles formed, however, not being fixed on polyvinyl alcohols, but instead being present in the composition as a mixture alongside them.

However, the fixing of organic and inorganic domains to form composite particles and also the provision of stable composite particles cause problems. This is because the inorganic particles and the organic monomers or the organic polymers usually have different polarities and tend to separate from each other or to agglomerate with each other.

If such an agglomeration occurs before or during the production of the composite particles, then, for example, the agglomerated inorganic particles are encapsulated by the organic polymer matrix in the course of the polymerization of the organic monomers, so that there is no uniform fixation of inorganic particles on the organic polymer matrix and thus ultimately no chemically uniform composite particles composed of organic and inorganic domains are formed. Corresponding mixtures are not present as colloidal primary particles in solvents. It may even happen that the inorganic particles and the organic polymer matrix are present as a mixture next to each other.

But even in the case of composite particles that are initially uniformly composed of inorganic and organic domains, the inorganic or organic domains can agglomerate over time, which results in gelation or formation of specks and thus inadequate storage stability of the composite particles. Agglomeration occurs especially at higher temperatures, for example from 40° C.

Agglomerated composite particles no longer have the desired application properties or are even completely unusable. To increase the storage stability of aqueous composite particle dispersions, protective colloids or specific additives were added as stabilizers, such as the hydroxyl group-containing alkylamino compounds recommended in DE-A 10 2004 010 155.

To solve the aforementioned problems, it was proposed in WO-A 2009/112370 to produce composite particles by condensation of siloxanes or polysiloxanes in the presence of polymers bearing functional groups. Functional groups mentioned are carboxylic acid, silane, sulfonic acid, sulfate, phosphate, phosphonate, isocyanate, amine, quaternized amine, hydrazine, epoxy, ether, hydroxyl and CO groups. Composite particle dispersions obtainable in this way, however, have high viscosities, especially in the case of aqueous dispersions having high solids contents, which makes their handling more difficult. It is also particularly difficult to provide composite particle dispersions having high solids contents in a stable form.

In order to increase the storage stability and to reduce the viscosity of composite particle dispersions with high solids content, WO2012/110618 recommends firstly producing composite particles based on organic polymers and finely divided inorganic solids and then polymerizing ethylenically unsaturated monomers onto the composite particles thus obtained. However, such a multi-stage process is complex.

The object of the present invention was to provide composite particles with which the aforementioned disadvantages are avoided as far as possible. In particular, composite particles should therefore be accessible which are also storage-stable in the form of aqueous dispersions having high solids contents, preferably also at elevated temperatures such as 50° C., and have a low viscosity.

SUMMARY OF THE INVENTION

The invention relates to composite particles based on finely divided inorganic solids and organic polymers, wherein the organic polymers are based on
a) one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, and olefins, vinyl aromatics and vinyl halides, and
b) one or more ethylenically unsaturated carboxylic acids having 3 to 11 carbon atoms, characterized in that the organic polymers have a polydispersity PD of ≥1.6.

DETAILED DESCRIPTION OF THE PREFERRED EMBODIMENTS

Composite particles generally comprise one or more organic polymer phases and finely divided inorganic solid particles distributed therein, which are preferably linked to the polymer chains of the organic polymer phase via physical bonds (for example via carboxyl-functional monomer units in the polymer) or via chemical bonds, especially covalent bonds. Chemical bonds can be formed, for example, by condensation reactions between the finely divided inorganic solids and the organic polymers, in particular via silicon-functional monomer units in the organic polymer. The organic polymers and the finely divided inorganic solids are generally not present or not exclusively present as a mere mixture alongside each other.

The finely divided inorganic solids are preferably metals or metal compounds, such as metal oxides or metal salts, or semimetals or semimetal compounds, such as semimetal oxides or semimetal salts.

Suitable metals are, for example, noble metal colloids, such as colloids of palladium, silver, ruthenium, platinum, gold or rhodium or alloys thereof. Metal oxides are, for example, the oxides of titanium, zirconium, tin, aluminum, barium, magnesium, iron, chromium, antimony, bismuth, zinc, nickel, cobalt, copper, yttrium or cerium or hydroxy oxides thereof. Examples of metal salts are metal sulfides, metal sulfates, carbonates, metal carbonates, phosphates, silicates, aluminates or borates. Corresponding examples are sulfides of iron, tin, mercury, cadmium, zinc, copper, silver, nickel, cobalt, manganese, chromium, titanium, zirconium, antimony or bismuth; sulfates, carbonates, phosphates, aluminates or borates of alkali metals/alkaline earth metals, zinc, zirconium, iron, aluminum or tin; silicates such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate, zirconium(IV) orthosilicate, metasilicates such as lithium metasilicate, calcium/magnesium metasilicate, calcium metasilicate, magnesium metasilicate, zinc metasilicate, sheet silicates such as sodium aluminum silicate or sodium magnesium silicate.

Silicon oxide, in particular silicon dioxide, may be mentioned as a preferred semimetal compound. Silicon dioxide may be in amorphous form and/or in various crystal structures. Suitable silicon dioxide is also known under the trade names Aerosil®, Nalco®, Levasil®, Ludox®, Nyacol®, Bindzil® and Snowtex®. Silicon dioxide can be in the form of waterglass or silica sols, for example.

The silicon oxides are most preferably based on units of the general formula

$$R^1_x Si(OR^2)_y O_{(4-x-y)/2} \quad \text{(I), in which}$$

x is 0, 1, 2 or 3 and y is 0, 1 or 2,
with the proviso that the sum of x+y is ≤3,
$R^1$ is a SiC-bonded monovalent hydrocarbon radical having 1 to 18 carbon atoms,
$R^2$ is a hydrogen atom or a hydrocarbon radical having 1 to 18 carbon atoms, which may be interrupted by one or more oxygen atoms separate from one another, or is a radical of the formula —COCH$_3$, —COC$_2$H$_5$ or —CH$_2$CH$_2$OH,
wherein the individual $R_1$, $R^2$ and also x and y are each defined independently of one another.

Examples of hydrocarbon radicals $R_1$ are alkyl radicals such as the methyl, ethyl, n-propyl, isopropyl, n-butyl, sec-butyl, amyl, hexyl, β-ethylhexyl, heptyl, octyl, isooctyl and octadecyl radicals; alkenyl radicals such as the vinyl, allyl, and butenyl radicals; alkynyl radicals; cycloalkyl radicals such as the cyclobutyl, cyclohexyl and methylcyclohexyl radicals; aryl radicals such as the phenyl radical; alkaryl radicals such as tolyl radicals; and aralkyl radicals such as the benzyl radical. Particular preference is given to the methyl, ethyl, vinyl and phenyl radicals.

Examples of substituted hydrocarbon radicals $R^1$ are halogenated hydrocarbon radicals such as the chloromethyl, 3-chloropropyl, 3-bromopropyl, 3,3,3-trifluoropropyl and 5,5,5,4,4,3,3-heptafluoropentyl radicals, and also the chlorophenyl, dichlorophenyl and trifluorotolyl radicals; mercaptoalkyl radicals such as the 2-mercaptoethyl and 3-mercaptopropyl radicals; cyanoalkyl radicals such as the 2-cyanoethyl and 3-cyanopropyl radicals; aminoalkyl radicals such as the 3-aminopropyl, N-(2-aminoethyl)-3-aminopropyl and N-(2-aminoethyl)-3-amino(2-methyl) propyl radicals; aminoaryl radicals such as the aminophenyl radical; acyloxyalkyl radicals such as the 3-acryloxypropyl and 3-methacryloxypropyl radicals; hydroxyalkyl radicals such as the hydroxypropyl radical; and radicals of the formulae HOCH$_2$CH(OH)CH$_2$SCH$_2$CH$_2$—, HOCH$_2$CH$_2$OCH$_2$—; or glycidyl ethers, especially propyl glycidyl ether.

$R^2$ is preferably a hydrogen atom or identical or different alkyl or alkoxyalkylene radicals having 1 to 4 carbon atom(s) per radical. Examples of hydrocarbon radicals $R^2$ are alkyl radicals such as the methyl, ethyl, n-propyl, isopropyl, n-butyl, sec-butyl and tert-butyl radicals; and alkoxyalkylene radicals such as the methoxyethylene and ethoxyethylene radicals. Particular preference is given to the methyl and ethyl radicals.

Preferably, in formula I, x is on average 0.1 to 2.0 and y is on average 0 to 0.5.

Preference is also given to silica sols modified with epoxysilane. To produce the modified silica sols, an epoxysilane, for example 3-glycidoxypropyltrimethoxysilane, can be added to the silica sol with stirring and optionally with heating. Here, the silica particles can participate in a condensation reaction, for example with the alkoxy groups of the silane, with binding of the epoxysilane to silica particles. The epoxy group can be hydrolyzed, for example to the diol. As a result, the stability of the composite particles can be further enhanced.

The particle size of the finely divided inorganic solids is preferably from 2 nm to 500 nm, more preferably 5 nm to 100 nm and most preferably 10 nm to 70 nm (determined by means of transmission electron microscopy; with the Libra 120 instrument from Zeiss).

Particularly suitable finely divided inorganic solids are those where the solubility in water at 20° C. and atmospheric pressure (1 atm=1.013 bar absolute) is ≤1 g/l, preferably ≤0.1 g/l and more preferably ≤0.01 g/l.

The finely divided inorganic solids are preferably used in the form of dispersions, in particular aqueous dispersions, and preferably have a solids content of 20 to 70% by weight, more preferably 30 to 60%, and most preferably 35 to 50% by weight.

The production of the finely divided inorganic solids is known to those skilled in the art and is effected, for example, by precipitation reactions or chemical reactions in the gas phase (for this cf. E. Matijevic, Chem. Mater. 1993, 5, pages 412 to 426; Ullmann's Encyclopedia of Industrial Chemistry, Vol. A 23, pages 583 to 660, Verlag Chemie, Weinheim, 1992; D. F. Evans, H. Wennerström in The Colloidal Domain, pages 363 to 405, Verlag Chemie, Weinheim, 1994 and R.J. Hunter in Foundations of Colloid Science, Vol. I, pages 10 to 17, Clarendon Press, Oxford, 1991).

The composite particles are preferably based on finely divided inorganic solids to an extent of preferably 2 to 45% by weight, more preferably 5 to 40% by weight and most preferably 10 to 30% by weight, based in each case on the dry weight of the components (such as finely divided inorganic solids and organic polymers), to produce the composite particles. Preferably, the composite particles in the aforementioned proportions are based on the finely divided inorganic solids, relative to the total weight of the composite particles.

The monomers a) of the organic polymers are preferably vinyl esters of carboxylic acids having 1 to 12 carbon atoms, more preferably vinyl esters of carboxylic acids having 1 to 8 carbon atoms and most preferably vinyl esters of carboxylic acids having 1 to 6 carbon atoms. Examples of suitable vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 5 to 13 carbon atoms, for example VeoVa9R or VeoVa10R (trade names from Shell). Preference is given to vinyl acetate.

Methacrylic esters or acrylic esters are preferably esters of unbranched or branched alcohols having 1 to 12 carbon atoms, more preferably 1 to 8 carbon atoms and most preferably 1 to 5 carbon atoms. Examples of preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Particular preference is given to methyl acrylate, methyl methacrylate, n-butyl acrylate, ethyl acrylate and 2-ethylhexyl acrylate.

The olefins, vinyl aromatics and the vinyl halides preferably have 1 to 12 carbon atoms, more preferably 1 to 9 carbon atoms and most preferably 1 to 8 carbon atoms. Preferred olefins are ethylene and propylene. Preferred vinylaromatics are styrene and vinyltoluene. A preferred vinyl halide is vinyl chloride.

The monomers a) preferably have no hydrophilic groups. Hydrophilic groups can be non-ionic, such as polyglycol groups, polyalcohol groups such as polyvinyl alcohol groups, or anionic, such as sulfate, sulfonate, phosphate or phosphonate groups, or cationic, such as ammonium groups.

Preferred organic polymers comprise one or more units of (meth)acrylic esters and/or vinyl aromatics.

The organic polymers are based on monomers a) preferably to an extent of 75 to 99.5% by weight, more preferably 80 to 99% by weight and most preferably 90 to 98% by weight, based on the total weight of the organic polymers.

The ethylenically unsaturated carboxylic acids b) preferably have 3 to 9 carbon atoms, more preferably 3 to 8 carbon atoms and most preferably 3 to 6 carbon atoms. The monomers b) are, for example, preferably ethylenically unsaturated mono- or dicarboxylic acids such as acrylic acid, methacrylic acid, crotonic acid, itaconic acid, fumaric acid or maleic acid, monoesters of fumaric acid or maleic acid such as the monoethyl and monoisopropyl esters. Particularly preferred monomers b) are ethylenically unsaturated monocarboxylic acids such as methacrylic acid, acrylic acid or crotonic acid.

The organic polymers are based on monomers b) preferably to an extent of 0.1 to 10% by weight, more preferably 0.2 to 5% by weight and most preferably 0.5 to 3% by weight, based on the total weight of the organic polymers.

In addition, the organic polymers can optionally be based on one or more ethylenically unsaturated silanes c). Examples of ethylenically unsaturated silanes c) are (meth)acryloxypropyltri(alkoxy)silanes or (meth)acryloxypropyldialkoxymethylsilanes, vinyltrialkoxysilanes or vinylmethyldialkoxysilanes, wherein the alkoxy groups present may be, for example, methoxy, ethoxy, propoxy, butoxy, acetoxy and ethoxypropylene glycol ether radicals. Preferred ethylenically unsaturated silanes are vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy) isopropoxysilane, vinyltributoxysilane, vinyltriacetoxysilane, 3-methacryloxypropyltrimethoxysilane, 3-methacryloxypropylmethyldimethoxysilane, methacryloxymethyltrimethoxysilane, 3-methacryloxypropyltris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinylltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane, vinyldimethoxylauryloxysilane and also polyethylene glycol-modified silanes. Particularly preferred ethylenically unsaturated silanes are vinyltrimethoxysilane, vinylmethyldimethoxysilane, vinyltriethoxysilane, vinylmethyldiethoxysilane, vinyltris(1-methoxy) isopropoxysilane, methacryloxypropyltris(2-methoxyethoxy)silane, 3-methacryloxypropyltrimethoxysilane, 3-methacryloxypropylmethyldimethoxysilane and methacryloxymethyltrimethoxysilane. The ethylenically unsaturated silanes preferably have no hydrophilic groups.

The organic polymers may be based on silanes c) preferably to an extent of 0 to 3% by weight, more preferably 0.01 to 1% by weight and most preferably 0.02 to 0.5% by weight, based on the total weight of the organic polymers. The organic polymers most preferably do not comprise any silane units c).

Furthermore, the organic polymers can additionally be based on one or more auxiliary monomers d), preferably to an extent of 0 to 15% by weight, more preferably 0.1 to 10% by weight and most preferably 0.5 to 5% by weight, based on the total weight of the organic polymers. Examples of auxiliary monomers are ethylenically unsaturated carboxamides and carbonitriles, preferably acrylamide and acrylonitrile; diesters of fumaric acid and maleic acid, such as the diethyl and diisopropyl esters; carboxylic anhydrides such as maleic anhydride; ethylenically unsaturated sulfonic acids or salts thereof, preferably vinylsulfonic acid, 2-acrylamido-2-methylpropanesulfonic acid; ethylenically unsaturated epoxides such as glycidyl methacrylate or glycidyl acrylate; ethylenically unsaturated hydroxy or keto compounds, for example hydroxyalkyl esters of methacrylic acid and acrylic acid such as hydroxyethyl, hydroxypropyl or hydroxybutyl acrylate or methacrylate, and compounds such as diacetone acrylamide and acetylacetoxyethyl acrylate or methacrylate; or vinyl ethers, such as methyl, ethyl or isobutyl vinyl ether. The auxiliary monomers preferably have 1 to 12 carbon atoms, more preferably 1 to 8 carbon atoms and most preferably 1 to 6 carbon atoms.

Preferred auxiliary monomers d) are hydroxyalkyl methacrylates and hydroxyalkyl acrylates.

Examples of suitable organic polymers are (meth)acrylate polymers, styrene-(meth)acrylate polymers, vinyl ester polymers, which comprise in each case one or more monomer units b) and optionally one or more monomer units c) and optionally one or more auxiliary monomer units d).

Preferred organic polymers are polymers of vinyl esters, in particular vinyl acetate, with 0.1 to 5% by weight, in particular 0.3 to 3% by weight, of ethylenically unsaturated carboxylic acids such as acrylic acid or methacrylic acid, and optionally 0.5% by weight, in particular 0.01 to 0.5% by weight, of ethylenically unsaturated silanes such as vinyltrimethoxysilane, vinyltriethoxysilane, vinylmethyldimethoxysilane or vinylmethyldiethoxysilane; wherein the aforementioned polymers may also comprise 5 to 45% by weight of butyl acrylate, VeoVa9, VeoVa10 or ethylene and optionally the aforementioned auxiliary monomers d), in particular hydroxyalkyl methacrylates and acrylates, in the aforementioned amounts, and wherein the figures in % by weight add up to 100% by weight in each case.

Preferred organic polymers are also polymers of (meth) acrylic esters, such as methyl (meth)acrylate and/or n-butyl (meth)acrylate, with 0.1 to 5% by weight, in particular 0.3 to 3% by weight of ethylenically unsaturated carboxylic acids, such as acrylic acid or methacrylic acid, and optionally 0.5% by weight, in particular 0.01 to 0.5% by weight, of ethylenically unsaturated silanes, such as vinyltrimethoxysilane, vinyltriethoxysilane, vinylmethyldimethoxysilane or vinylmethyldiethoxysilane; wherein the aforementioned polymers may also comprise 0 to 50% by weight, in particular 0.1 to 50% by weight, of styrene and optionally the aforementioned auxiliary monomers d), in particular hydroxyalkyl methacrylates and acrylates, in the aforementioned amounts, and wherein the figures in % by weight add up to 100% by weight in each case.

The organic polymers have a polydispersity PD of preferably 2, more preferably 2 to 1000, even more preferably 3 to 500, still more preferably 4 to 200 and most preferably 5 to 150.

The organic polymers are preferably in bimodal form, i.e. as a mixture of particles of which the particle size distribution has two maxima, or in polymodal form, i.e. as a mixture of particles which do not have a monomodal or bimodal particle size distribution. Organic polymers in monomodal form are present as a mixture of particles with uniform particle size.

The organic polymers preferably have weight-average particle diameters Dw between 20 nm and 500 nm, more preferably 50 nm and 300 nm and most preferably 70 nm and 200 nm.

The polydispersity PD is the ratio of weight-average particle diameter Dw to number-average particle diameter Dn, PD=Dw/Dn. The parameters Dw and Dn or the particle size distribution are determined by means of laser light diffraction and laser light scattering based on the organic polymers or the composite particles, after sufficient dilution of the aqueous polymer dispersions with fully demineralized water, using the measuring instrument LS13320 with the optical model PVAC.RF780D, including PIDS, from Beckmann-Coulter, and in accordance with the instructions of the equipment manufacturer.

The monomer selection and the selection of the proportions by weight of the monomers is generally made so as to result in a glass transition temperature Tg of −60° C. to +120° C., preferably −50° C. to +100° C. The glass transition temperature Tg of the polymers can be determined in a known manner by means of differential scanning calorimetry (DSC). The approximate Tg can also be predetermined using the Fox equation. According to Fox T. G., Bull. Am. Physics Soc. 1, 3, page 123 (1956): 1/Tg=x1/Tg1+ x2/Tg2+ . . . +xn/Tgn, where xn is the mass fraction (% by weight/100) of the monomer n, and Tgn is the glass transition temperature in Kelvin of the homopolymer of the monomer n. Tg values for homopolymers are listed in Polymer Handbook 2nd Edition, J. Wiley & Sons, New York (1975).

The composite particles are preferably based on organic polymers to an extent of 55 to 98% by weight, more preferably 60 to 95% by weight and most preferably 70 to 90% by weight, based in each case on the dry weight of the components (such as finely divided inorganic solids and organic polymers), to produce the composite particles. Preferably, the composite particles in the aforementioned proportions are based on the organic polymers, relative to the total weight of the composite particles.

The organic polymers are generally obtainable by means of free-radically initiated aqueous emulsion polymerization of one or more ethylenically unsaturated monomers a) and one or more ethylenically unsaturated monomers b) in the presence of one or more emulsifiers, wherein a part of the total amount of emulsifiers used is initially charged prior to the start of the polymerization and the remaining part of the emulsifiers is metered in after the start of the polymerization.

The emulsion polymerization according to the invention generally results in bimodal or polymodal organic polymers and in organic polymers with the aforementioned polydispersity PD.

The total amount of emulsifier is preferably 0.1 to 5% by weight, more preferably 0.5 to 3% by weight and most preferably 1 to 2% by weight, based on the total weight of the monomers.

Prior to the start of the emulsion polymerization, preferably 0.001 to 0.5% by weight, more preferably 0.01 to 0.4% by weight and most preferably 0.01 to 0.3% by weight of emulsifier are initially charged, based on the total weight of water in the batch.

Prior to the start of the emulsion polymerization, preferably 0.001 to 5% by weight, more preferably 0.01 to 1% by weight and most preferably 0.08 to 0.5% by weight of emulsifier are initially charged, based on the total weight of all emulsifiers used in the emulsion polymerization.

Suitable emulsifiers are generally anionic or non-ionic emulsifiers or mixtures thereof, for example:
1) Alkyl sulfates, especially those having an alkyl chain length of 8 to 18 carbon atoms, alkyl and alkylaryl ether sulfates having 8 to 18 carbon atoms in the hydrophobic radical and 1 to 50 ethylene oxide units.
2) Sulfonates, especially alkyl sulfonates having 8 to 18 carbon atoms, alkylaryl sulfonates having 8 to 18 carbon atoms, esters or semi-esters of sulfosuccinic acid with monohydric alcohols or alkylphenols having 4 to 15 carbon atoms in the alkyl radical;
optionally, these alcohols or alkylphenols may also be ethoxylated with 1 to 40 ethylene oxide units.
3) Partial esters of phosphoric acid or alkali metal or ammonium salts thereof, particularly alkyl and alkylaryl phosphates having 8 to 20 carbon atoms in the organic radical, alkyl ether phosphates and alkylaryl ether phosphates having 8 to 20 carbon atoms in the alkyl or alkylaryl radical and 1 to 50 EO units.
4) Alkyl polyglycol ethers preferably having 8 to 40 EO units and alkyl radicals having 8 to 20 carbon atoms.
5) Alkylaryl polyglycol ethers preferably having 8 to 40 EO units and 8 to 20 carbon atoms in the alkyl and aryl radicals.
6) Ethylene oxide/propylene oxide (E0/P0) block copolymers, preferably having 8 to 40 EO or PO units.

EO unit signifies ethylene oxide unit and PO unit signifies propylene oxide unit. The emulsifiers 1)~3) mentioned are generally anionic emulsifiers, while the emulsifiers 4)~6) are non-ionic emulsifiers.

Preference is given to mixtures of one or more anionic emulsifiers and one or more non-ionic emulsifiers. Particularly preferred are mixtures of one or more esters or semi-esters of sulfosuccinic acid with monohydric alcohols or alkylphenols having 4 to 15 carbon atoms in the alkyl radical as anionic emulsifiers and one or more alkyl polyglycol ethers, preferably having 8 to 40 EO units and alkyl radicals having 8 to 20 carbon atoms, as non-ionic emulsifiers, especially in a weight ratio of from 8:1 to 1:8.

The emulsion polymerization can also be carried out in the presence of one or more protective colloids. If protective colloids are used, this is effected in an amount of 0.01 to 1.0% by weight, based on the total weight of the monomers. The emulsion polymerization is preferably carried out in the absence of protective colloids. Examples of protective colloids are partially saponfied or fully saponfied polyvinyl alcohols; polyvinyl acetals; polyvinylpyrrolidones; polysaccharides in water-soluble form, such as starches (amylose and amylopectin), celluloses and the carboxymethyl, methyl, hydroxyethyl, hydroxypropyl derivatives thereof, dextrins and cyclodextrins; proteins such as casein or caseinate, soya protein, gelatin; lignosulfonates; synthetic polymers such as poly(meth)acrylic acid, copolymers of (meth) acrylates with carboxy-functional comonomer units, poly (meth)acrylamide, polyvinylsulfonic acids and the water-soluble copolymers thereof; melamine-formaldehydesulfonates, naphthalene-formaldehydesulfonates, styrene-maleic acid and vinyl ether-maleic acid copolymers. The protective colloids can be initially charged or metered in before the start of the emulsion polymerization.

Some of the monomers are preferably initially charged and the remainder of the monomers is metered in after the emulsion polymerization has been initiated. The monomers are initially charged at a proportion of preferably 1 to 20% by weight, more preferably 2 to 15% by weight and most preferably 3 to 10% by weight, based in each case on the total weight of the monomers, and the remainder metered in after initiation of the emulsion polymerization. The proportion of monomers b), c) and d) in the initial charge is preferably not more than 5% by weight, based on the total weight of the initially charged monomers.

The emulsifiers and monomers can be metered in separately or as a mixture. Emulsion and monomer are preferably metered in separately from each other after the start of the emulsion polymerization. The metered addition is preferably started 15 minutes to 35 minutes after the start of the emulsion polymerization.

Some of the mixing water is generally initially charged and the remainder is metered in wherein, for example, the metered addition can take place in the context of the initiator metered addition and the emulsifier metered addition.

The polymerization temperature is generally 40° C. to 100° C., preferably 60° C. to 90° C. The copolymerization of gaseous comonomers, such as ethylene, 1,3-butadiene or vinyl chloride, can also be carried out under pressure, generally between 5 bar and 100 bar.

The emulsion polymerization can be initiated with the initiators or redox initiator combinations customary for emulsion polymerization. Suitable organic initiators are, for example, hydroperoxides such as tert-butyl hydroperoxide, tert-butyl peroxipivalate, cumene hydroperoxide, isopropylbenzene monohydroperoxide or azo compounds such as azobisisobutyronitrile. Suitable inorganic initiators are the sodium, potassium and ammonium salts of peroxodisulfuric acid. The initiators mentioned are generally used in an amount of 0.05 to 3% by weight, based on the total weight of the monomers.

The redox initiators used are preferably combinations of the initiators mentioned in combination with reducing agents. Suitable reducing agents are, for example, the sulfites and bisulfites of alkali metals and of ammonium, for example sodium sulfite, the derivatives of sulfoxylic acid such as zinc or alkali metal formaldehyde sulfoxylates, for example sodium hydroxymethanesulfinate, and ascorbic acid. The amount of reducing agent is preferably 0.01 to 5.0% by weight, based on the total weight of the monomers.

To initiate the emulsion polymerization, some of the initiator can be initially charged and some can be metered in, or it can be metered in as a whole. The emulsion polymerization is preferably started by heating the batch to the polymerization temperature and metering in the initiator, preferably in aqueous solution.

Chain transfer agents may be used to control the molecular weight during the emulsion polymerization. They are typically used in amounts between 0.01 and 5.0% by weight, based on the monomers to be polymerized. Chain transfer agents can be added separately or also mixed with reaction components. Examples of such agents are n-dodecyl mercaptan, tert-dodecyl mercaptan, mercaptopropionic acid, methyl mercaptopropionate, isopropanol, and acetaldehyde.

On completion of the emulsion polymerization, residual monomers may be removed by post-polymerization according to known methods, for example by post-polymerization initiated by a redox catalyst. Volatile residual monomers can also be removed by means of distillation, preferably under reduced pressure, and optionally while passing inert entraining gases through or over, such as air, nitrogen or water vapor.

The organic polymers obtainable in this way are generally in the form of aqueous dispersions and have a solids content of preferably more than 60% by weight, in particular from 65 to 75% by weight.

The invention further relates to a process for producing composite particles by
mixing one or more finely divided inorganic solids and one or more organic polymers
in a solvent or a mixture of two or more solvents,
wherein finely divided inorganic solids are fixed to organic polymers and thus composite particles are formed, and
wherein the organic polymers are based on
a) one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, and olefins, vinyl aromatics and vinyl halides, and
b) one or more ethylenically unsaturated carboxylic acids having 3 to 11 carbon atoms, characterized in that organic polymers are in bimodal or polymodal form.

The solvent used for the process according to the invention can be water or an organic solvent, optionally in combination with water, or a solvent mixture of two or more organic solvents, optionally in combination with water. The use of water as solvent or as a component of the solvent mixture is not absolutely necessary, since the residual water present in commercially available starting materials is sufficient for carrying out the process according to the invention.

Suitable organic solvents are, for example, alcohols having 1 to 6 carbon atoms such as methanol, ethanol, n-propanol or isopropanol, ketones such as acetone or methyl ethyl ketone, esters such as methyl acetate, ethyl acetate, propyl acetate or butyl acetate. Preferred solvents are water or isopropanol. Preference is given to solvent mixtures comprising water and isopropanol.

The finely divided inorganic solids and/or the organic polymers can be used in pure form or in a solvent. The finely divided inorganic solids are preferably used in one or more solvents, in particular in water and optionally an additional solvent.

The finely divided inorganic solids and/or the organic polymers can be initially charged in full in a solvent. Alternatively, part of the finely divided inorganic solids and/or the organic polymers can be initially charged, and the remainder of the finely divided inorganic solids and/or the organic polymers can be added. The organic polymers are preferably initially charged in a solvent or a solvent mixture and the finely divided inorganic solids are added completely or partially in pure form during the condensation.

The temperature is preferably 1 to 100° C., more preferably 10 to 80° C. and most preferably 20 to 70° C. The process is carried out preferably for 1 to 24 hours, particularly preferably for 2 to 12 hours.

The process is carried out at a pH of preferably 1 to 14, more preferably 7 to 12 and most preferably 8 to 10.

The composite particles obtainable in this way are generally in the form of an aqueous dispersion.

To produce the composite particles in the form of powders, the dispersions of the composite particles are dried, optionally with the addition of protective colloids as a drying aid. Suitable drying processes are, for example, fluidized bed drying, roll drying, freeze drying or spray drying. Suitable drying aids are, for example, the protective colloids mentioned above. Preference is given to using polyvinyl alcohols as drying aids. The aqueous mixtures are preferably spray-dried. Spray drying is carried out in conventional spray drying systems, in which atomization may be achieved using one-phase, two-phase or multiphase nozzles or using a rotating disk. The outlet temperature is generally selected in the range of 45° C. to 120° C., preferably between 60° C. to 90° C.

During drying, a content of up to 1.5% by weight of antifoaming agent, based on the polymeric constituents, has often proven to be favorable. To increase the storage stability by improving stability to blocking, especially in the case of powders with a low glass transition temperature, the powder obtained can be provided with an antiblocking agent (anticaking agent), preferably up to 30% by weight, based on the total weight of polymeric constituents. Examples of antiblocking agents are calcium carbonate or magnesium carbonate, talc, gypsum, silicas such as highly dispersed silicas, kaolins, metakaolin, calcined kaolin, and silicates having particle sizes preferably in the range of 10 nm to 100 μm.

The viscosity of the dispersion to be dried is adjusted via the solids content so that a value of <1500 mPas (Brookfield viscosity at 20 revolutions and 23° C.), preferably <500 mPas, is obtained.

To improve the application properties, further additives can be added to the composite particles, such as binders, pigments, fillers, in particular zeolites, foam stabilizers, hydrophobizing agents or air-entraining agents. These additives are preferably added during or after drying the dispersion.

The composite particles thus obtained in the form of powders can be brought to the desired form by subsequent grinding and/or redispersion in water, organic solvents or reactive diluents. The aforementioned monomers, for example, are suitable as reactive diluents. Preferred reactive diluents are ethylenically unsaturated aromatics such as styrene, (meth)acrylates such as ethylene glycol dimethacrylate, or epoxides.

The composite particles are preferably in the form of a dispersion and preferably have a solids content of 45 to 70% by weight, more preferably 50 to 68% by weight, and most preferably 55 to 65% by weight.

The composite particles have a viscosity of preferably 3000 mPas, more preferably 2000 mPas and most preferably 1000 mPas (Brookfield viscosity at 25° C. as a 25% solution in water).

The composite particles in the form of an aqueous dispersion with a solids content of 10% by weight preferably have a turbidity of ≤700 EBC, more preferably ≤600 EBC, yet more preferably ≤400 EBC and most preferably ≤200 EBC (determination according to the formazine standard in accordance with DIN 38404 at room temperature with the turbidity measuring instrument from Metrisa GmbH: TA6FS/Model 251). Turbidity indicates that finely divided inorganic solids are not homogeneously distributed in the composite particles. Transparent films are desirable in the application of the composite particles.

The composite particles preferably have a glass transition temperature Tg of −60° C. to +120° C. and more preferably −50 to +100° C.

The inorganic domains of the composite particles preferably have mean particle sizes of 2 nm to 800 nm, more preferably 4 nm to 300 nm and most preferably 10 nm to 100 nm (determined with the Libra 120 transmission electron microscope from Zeiss).

The composite particles preferably do not contain any divalent or trivalent metal cations, for example of aluminum.

The composite particles are suitable as binders, co-binders or additives for improving the application properties of a wide variety of products. By using the composite particles in coating compositions or adhesives, for example, the thermal stability or scratch resistance thereof can be increased. Adhesives comprising composite particles also often show improved flow characteristics and a stable modulus of elasticity at elevated temperatures and, after application, result in removable adhesive films for example. Coating compositions comprising composite particles can be used to provide coatings having a matt effect. Equally, the use of the composite particles is advantageous in formulations for powder coatings, plastic materials and composite materials, for example for production of plastic components, composite components or packaging materials. The composite particles are also suitable for surface treatment for synthetic or natural materials, such as fibers or particles such as, preferably, rocks, wood, leather, paper, textiles, plastics such as plastic films. In this context, the composite particles act, for example, as impregnating agents, sealants or as primers for enhancement of adhesion, as a barrier layer, corrosion protection or soil repellent. The soil-repellent effect can be exploited in an advantageous manner especially in the case of relevant applications in rugs or fitted carpets. The composite particles can also be used to produce low-flammability coatings for wood, plastics, leather and paper. Stone can be reinforced or renovated. In products for the packaging industry, addition of the composite particles can produce a gas barrier.

In general, the composite particles are suitable as additives for coating compositions or as binders for adhesives. The coating compositions can be, for example, paints or clearcoats. The coating compositions are also suitable for coating fibers, such as synthetic or natural fibers, or woven or non-woven textiles or paper.

Surprisingly, aqueous dispersions of the composite particles according to the invention are also storage-stable and have a low viscosity and are therefore easy to handle—and do this even when aqueous dispersions with a high solids content are present. For instance, corresponding dispersions do not tend to gel and are stable to shear. The composite particles film in an excellent manner, and do this despite their proportion of inorganic constituents which ordinarily do not film at all. In addition, the filmed composite particles exhibit excellent mechanical properties and strengths and are water-resistant. This property profile makes the composite particles according to the invention particularly interesting, for example, as binders or co-binders for crack-bridging paints.

Furthermore, the composite particles are thermally stable, UV-resistant, increase the color strength of paints and adhere to different substrates, but are still not tacky. The use of the composite particles according to the invention in coating compositions results in coatings which are less prone to crack formation.

The following examples serve to elucidate the invention in detail and are in no way to be understood as limiting.
Production of Organic Polymers:

Example 1 (Ex. 1)

305.9 g of deionized water, 0.15 g of a 20% aqueous solution of a dialkyl sulfosuccinate as anionic emulsifier (AEROSOL MA®), 0.02 g of a 40% aqueous solution of an isotridecyl ethoxylate having 15 EO units as non-ionic emulsifier (GENAPOL X-150®) and 74 g of the monomer mixture "Addition 1" mentioned below were initially charged in a 3 liter three-necked flask equipped with a reflux condenser and anchor stirrer, and the mixture was heated to 75° C. with stirring (speed 150 rev/min) under nitrogen.

At this temperature, initiator solution (0.94 g of potassium peroxodisulfate in 20.4 g of water) was added to the reactor, whereby the polymerization was started.

30 minutes after the start of the polymerization, metered addition of monomers (addition 1), emulsifiers (addition 2) and initiator solution (addition 3) was started from separate vessels. The metered addition times for additions 1 and 2 were 4 hours and addition 3 was 4.5 hours.
Addition 1 (Monomer Mixture):
  14.6 g of acrylic acid
  14.6 g of hydroxyethyl acrylate
  1280.0 g of butyl acrylate
  87.4 g of ethyl acrylate
  58.3 g of methyl methacrylate
  0.3 g of dodecyl mercaptan
Addition 2 (Emulsifier Mixture):
  135.0 g of water
  82.3 g of Aerosol MA® (20% solution)
  10.5 g of Genapol X-150® (40% solution)
Addition 3 (Initiator Solution):
  102.0 g of water
  3.9 g of potassium peroxodisulfate After completion of the metered additions, polymerization was continued for 2 hours at 75° C. After cooling to room temperature, the pH was adjusted to 5 with an ammonia solution.

The dispersion thus obtained was free of specks according to microscopic examinations. The solids content of the dispersion, the Brookfield viscosity thereof (at 25° C. and 20 rev/min) and the polydispersity PD (light scattering LS 13320 from Beckman-Coulter) of the organic polymers are summarized in Table 2.

Example 2 (Ex. 2)

As in Example 1, with the difference that 0.1 parts by weight of vinyltriethoxysilane (GENIOSIL GF 56, trade name of WACKER Chemie) was also used.

The dispersion thus obtained was free of specks according to microscopic examinations. The properties of the organic polymers and the dispersion are summarized in Table 2.

TABLE 1

Monomer composition of the organic polymers:

| | AA* wt % | HEA* wt % | BA* wt % | EA* wt % | MMA* wt % | GF 56* wt % |
|---|---|---|---|---|---|---|
| Ex. 1 | 1.0 | 1.0 | 88.0 | 6.0 | 4.0 | |
| Ex. 2 | 1.0 | 1.0 | 87.9 | 6.0 | 4.0 | 0.10 |
| C. Ex. 3 | 1.0 | 1.0 | 88.8 | 6.0 | 4.0 | |

*AA: acrylic acid; HEA: hydroxyethyl acrylate; BA: butyl acrylate; EA: ethyl acrylate; MMA: methyl methacrylate; GF 56: vinyltriethoxysilane.

TABLE 2

Properties of the organic polymers:

| | Solids content [%] | Brookfield viscosity [mPa · s] | Polydispersity PD |
|---|---|---|---|
| Ex. 1 | 70 | 628 | 6.2 |
| Ex. 2 | 65 | 960 | 127 |
| C. Ex. 3 | 50 | 5,790 | 1.5 |

Comparative Example 3 (C. Ex. 3)

601 g of deionized water, 1.8 g of a 20% aqueous solution of a dialkyl sulfosuccinate as anionic emulsifier (AEROSOL MA®), 0.24 g of a 40% aqueous solution of an isotridecyl ethoxylate having 15 EO units as non-ionic emulsifier (GENAPOL X-150®) and 74 g of the monomer mixture "Addition 1" mentioned below were initially charged in a 3 liter three-necked flask equipped with a reflux condenser and anchor stirrer, and the mixture was heated to 75° C. with stirring (speed 150 rev/min) under nitrogen.

At this temperature, initiator solution (1.8 g of potassium peroxodisulfate in 40 g of water) was added to the reactor, whereby the polymerization was started.

30 minutes after the start of the polymerization, metered addition of monomers (addition 1), emulsifiers (addition 2) and initiator solution (addition 3) was started from separate vessels. The metered addition times for additions 1 and 2 were 4 hours and addition 3 was 4.5 hours.
Addition 1 (Monomer Mixture):
  12.0 g of acrylic acid (AA)
  12.0 g of hydroxyethyl acrylate (HEA)
  1054.8 g of butyl acrylate (BA)
  71.9 g of ethyl acrylate (EA)
  47.9 g of methyl methacrylate (MMA)
  0.3 g of dodecyl mercaptan (DMC)
Addition 2 (Emulsifier Mixture):
  200.4 g of water
  161.7 g of Aerosol MA® (20% solution)
  20.6 g of Genapol X-150® (40% solution)
Addition 3 (Initiator Solution):
  200.4 g of water
  7.7 g of potassium peroxodisulfate After completion of the metered additions, polymerization was continued for 2 hours at 75° C. After cooling to room temperature, the pH was adjusted to 5 with an ammonia solution.

The dispersion thus obtained was practically free of specks according to microscopic examinations. The properties of the organic polymers and the dispersion are summarized in Table 2.

Example 4: Production of Modified Silica Sol

While stirring at 45° C., 32 g of 3-glycidoxypropyltriethoxysilane (GENIOSIL GF 80, trade name of WACKER Chemie) were metered in to 1000 g of silica sol (Bindzil 2040, trade name of Akzonobel, solids content of 40%) and 48 g of water over 30 minutes.

After 6 hours, the volatile components and some of the water were distilled off under reduced pressure at 60° C. and the dispersion was cooled to room temperature and filtered (mesh size 70 micrometers).

The modified silica sol thus obtained had a solids content of 40% and was stable, homogeneous and free of specks.

Production of Composite Particles:

Composite Particles K-1:

839 g of the dispersion from Example 1 and 161 g of silica sol from Example 4 were initially charged in a jacketed reactor at 50° C. and the mixture was stirred for 3 hours.

A stable and homogeneous composite dispersion was obtained. The solids content, the Brookfield viscosity (at 25° C. and 20 rev/min) of the composite dispersion thus obtained and the silica content of the composite particles are summarized in Table 3.

Composite Particles K-2:

700 g of the dispersion from Example 1 and 300 g of silica sol from Example 4 were initially charged in a jacketed reactor at 50° C. and the mixture was stirred for 3 hours.

A stable and homogeneous composite dispersion was obtained. The solids content, the Brookfield viscosity and the silica content of the composite dispersion thus obtained are summarized in Table 3.

Composite Particles K-3:

847.5 g of the dispersion from Example 2 and 152.5 g of silica sol from Example 4 were initially charged in a jacketed reactor at 50° C. and the mixture was stirred for 3 hours. A stable and homogeneous composite dispersion was obtained. The solids content, the Brookfield viscosity and the silica content of the composite dispersion thus obtained are summarized in Table 3.

Comparative Composite Particles VK-4:

878.7 g of the dispersion from Example 3 and 121.3 g of silica sol from Example 4 were initially charged in a jacketed reactor at 50° C. and the mixture was stirred for 3 hours. The silica content was 10% by weight based on the total dry weight of the organic copolymer and silicate particles. The solids content, the Brookfield viscosity and the silica content of the composite dispersion thus obtained are summarized in Table 3.

TABLE 3

Properties and test results of the composite particles:

| Composite particles | Silica [wt. %][a] | Solids content [%] | Viscosity [mPa · s] | Storage stability |
|---|---|---|---|---|
| K-1 | 10% | 65% | 152 | stable |
| K-2 | 20% | 61% | 101 | stable |
| K-3 | 10% | 61% | 550 | stable |
| VK-4 | 10% | 48.8% | 4,870 | gelled |

[a] Silica content, based on the total weight of the composite particles;

Testing the Storage Stability of Aqueous Dispersions of the Composite Particles:

The respective composite dispersions were stored in closed containers at 50° C. for four weeks. The test results are listed in Table 3.

The comparative composite particles VK-4 were completely gelated after testing.

In contrast, in the case of the composite particles K1 to K3 according to the invention, no gelation and no significant increase in viscosity were found.

The invention claimed is:

1. Composite particles comprising finely divided inorganic solids and organic polymers, wherein the organic polymers are prepared from monomers comprising:
   a) one or more ethylenically unsaturated monomers selected from the group consisting of vinyl esters of carboxylic acids having 1 to 15 carbon atoms, methacrylic esters or acrylic esters of unbranched or branched alcohols having 1 to 15 carbon atoms, olefins, vinyl aromatics, vinyl halides, and mixtures thereof, and
   b) one or more ethylenically unsaturated carboxylic acids having 3 to 11 carbon atoms, wherein
   the organic polymers have a particle diameter polydispersity PD of ≥2, and wherein the organic polymers are obtained by free-radically initiated aqueous emulsion polymerization of one or more ethylenically unsaturated monomers a) and one or more ethylenically unsaturated monomers b) in the presence of one or more emulsifiers,
      wherein a part of the total amount of emulsifiers used is initially charged prior to the start of the polymerization and the remaining part of the emulsifiers is metered in after the start of the polymerization.

2. The composite particles of claim 1, wherein the finely divided inorganic solids are metals or metal compounds, or semimetals or semimetal compounds.

3. The composite particle of claim 1, wherein the finely divided inorganic solids comprise silicon dioxide derived from waterglass or a silica sol.

4. The composite particles of claim 1, wherein the composite particles are based to an extent of 2 to 45% by weight on finely divided inorganic solids and/or to an extent of 55 to 98% by weight on organic polymers, based on the total weight of the composite particles.

5. The composite particles of claim 1,
   wherein the organic polymers are based to an extent of 75 to 99.5% by weight on monomers a) and/or to an extent of 0.1 to 10% by weight on monomers b), based on the total weight of organic polymers.

6. The composite particles of claim 1, wherein the organic polymers are polymers of
   vinyl esters with 0.1 to 5% by weight of ethylenically unsaturated carboxylic acids and ≤0.5% by weight of ethylenically unsaturated silanes, wherein optionally 5 to 45% by weight of one or more monomers selected from the group consisting of butyl acrylate, ethylene, hydroxyalkyl methacrylates, acrylates, and mixtures thereof are copolymerized; or
   (meth)acrylic esters with 0.1 to 5% by weight of ethylenically unsaturated carboxylic acids and ≤0.5% by weight of ethylenically unsaturated silanes, wherein optionally 0.1 to 50% by weight of styrene and optionally one or more hydroxyalkyl methacrylates and/or acrylates are copolymerized;
   wherein the figures in % by weight in each case add up to 100% by weight.

7. The composite particles of claim 1, wherein prior to the start of the emulsion polymerization, 0.001 to 5% by weight of emulsifier are initially charged, based on the total weight of the total emulsifiers used in the emulsion polymerization.

8. A process for producing composite particles of claim 1, comprising:
mixing one or more finely divided inorganic solids and one or more organic polymers
in a solvent or a mixture of two or more solvents,
wherein finely divided inorganic solids become fixed to the organic polymers and thus composite particles are formed,
wherein the organic polymers are based on
a) one or more ethylenically unsaturated monomers selected from the group consisting of vinyl esters of carboxylic acids having 1 to 15 carbon atoms, methacrylic esters or acrylic esters of unbranched or branched alcohols having 1 to 15 carbon atoms, olefins, vinyl aromatics, vinyl halides, and mixtures thereof, and
b) one or more ethylenically unsaturated carboxylic acids having 3 to 11 carbon atoms, wherein the organic polymers have bimodal or polymodal particle size distribution and have a particle diameter polydispersity PD of ≥2.

9. In a powder paint coating composition, adhesive, hydraulically setting coating composition, or formulation of plastic or composite materials which employ a binder, cobinder, or additive, the improvement comprising employing the composite particles of claim 1 as the binder, cobinder, or additive.

10. A surface treatment composition comprising composite particles of claim 1.

11. The composite particles of claim 1,
wherein 0.001 to 1% by weight the total amount of emulsifiers used is initially charged prior to the start of the polymerization and the remaining part of the emulsifiers is metered in after the start of the polymerization.

12. The composite particles of claim 1, wherein the particle diameter polydispersity PD is from 4 to 1000.

13. The composite particles of claim 1, wherein the organic polymers contain no units derived from a silane.

14. The composite particles of claim 1, wherein the emulsion polymerization is carried out in the absence of protective colloids.

15. The composite particles of claim 1, wherein the organic polymers are selected from the group consisting of (meth)acrylate and styrene-(meth)acrylate polymers also containing at least one ethylenically unsaturated carboxylic acid monomer b) having 3 to 11 carbon atoms, and optionally one or more auxiliary monomers selected from the group consisting of ethylenically unsaturated carboxamides, ethylenically unsaturated carbonitriles, diesters of fumaric acid and maleic acid; carboxylic anhydrides; ethylenically unsaturated sulfonic acids or salts thereof; ethylenically unsaturated epoxides; ethylenically unsaturated hydroxy or keto compounds, diacetone acrylamide; acetylacetoxyethyl meth)acrylate; vinyl ethers, and mixtures thereof.

* * * * *